Figure 1:
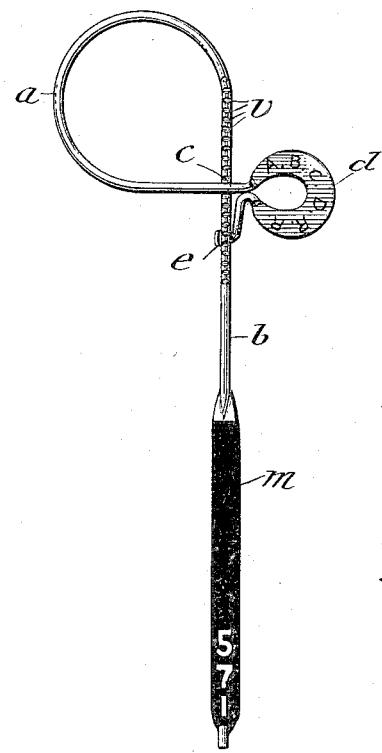

W. M. BROOKS.
SELF LOCKING CAR SEAL.
APPLICATION FILED OCT. 8, 1915.

1,163,614.

Patented Dec. 7, 1915.

Inventor:
Winfred Mudge Brooks,
By W. Ers Lamb, Atty.

UNITED STATES PATENT OFFICE.

WINFRED MUDGE BROOKS, OF EAST ORANGE, NEW JERSEY, ASSIGNOR TO E. J. BROOKS & CO., OF NEW YORK, N. Y., A CORPORATION OF NEW YORK.

SELF-LOCKING CAR-SEAL.

1,163,614.  Specification of Letters Patent.  Patented Dec. 7, 1915.

Application filed October 8, 1915.  Serial No. 54,744.

*To all whom it may concern:*

Be it known that I, WINFRED MUDGE BROOKS, a citizen of the United States of America, and a resident of East Orange, in the State of New Jersey, have invented a new and useful Improvement in Self-Locking Car-Seals, of which the following is a specification.

This invention relates to metallic seals adapted to be applied and sealed without tools and to prevent tampering therewith without detection and to certain novel improvements as hereinafter more particularly described and claimed.

One sheet of drawings accompanies this specification as part thereof, in which like reference characters denote like parts throughout.

Figure 2:
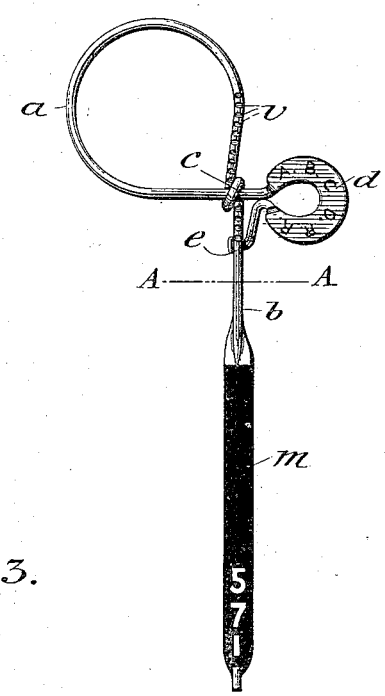
Figure 3:
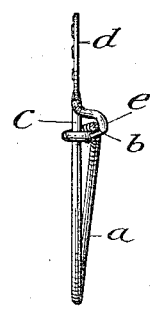

Figure 1 is a face view of the improved seal, unsealed. Fig. 2 is a face view of the same sealed; Fig. 3 is an end view, in part section, taken on the line A—A of Fig. 2.

Referring to the drawing $a$ represents the primary loop adapted to pass through the staples or other fastening means to be sealed, $b$ represents a sealing shank having transverse cut nicks on one side $v$, $c$ represents the seal core around which the sealing shank is adapted to be coiled, $d$ represents the secondary coil, flattened and embossed, $e$ represents a catch integral with said secondary coil and adapted to engage and secure the sealing shank both before and after sealing, while $m$ represents the flattened end of the sealing shank showing the serial number of the seal.

The seal as it leaves the factory appears as in Fig. 1, consisting of a piece of wire bent and pressed into the shape shown, in which it will be noted that the nicked portion of the sealing shank passes under the seal core $c$ and over the catch $e$ thus preliminarily locking the primary coil $a$. By this means a group of serially numbered seals arranged in order may be strung on a wire passing through this primary loop, upon which they will be securely held and from which they can be removed individually as needed without unfastening the wire by simply uncatching the sealing shank of the particular seal from its retaining catch.

The serial numbers are preferably impressed in the flattened end of the sealing shank and brought out in strong contrast by first submerging the seal in a white paint and then rolling a black paint on the flattened surface thus bringing out the letters in bold relief.

The name or initials of the party or concern using the seal can be conveniently impressed on the flattened secondary loop which serves both to prevent the withdrawal of the locking coil from the seal core after sealing and as a thumb grasp in handling the seal.

In operation the improved seal is removed from the bundle of seals by uncatching the sealing shank which is then passed through the staples or other fastening means which are to be sealed. The sealing shank is then wrapped or coiled about the seal core with its nicked side innermost and finally again snapped over the catch $e$ which protects it from accidental disturbance.

Obviously the device can be made from wire of round or other suitable cross-section and like modifications will suggest themselves to those skilled in the art.

Having thus fully described my invention, I claim:—

1. A self-locking seal of wire, comprising a primary loop, a sealing shank integral with one end thereof, a seal core integral with the other end, a secondary loop flattened and embossed integral with the seal core and terminating in a catch perpendicular to said primary loop, said sealing shank passing under said seal core and over said catch and adapted to be coiled about said seal core and caught over said catch after sealing.

2. A self-locking seal of wire, comprising a primary loop, a sealing shank integral with one end thereof, a seal core integral with the other end, a secondary loop integral with said seal core and terminating in a catch perpendicular to said primary loop, said sealing shank passing under said seal core and over said catch and adapted to be coiled about said seal core forming a locking coil and to be caught over said catch and means for preventing the uncoiling of said locking coil.

3. A self-locking seal of wire, comprising a primary loop, a sealing shank integral with one end thereof, a seal core integral with the other end, a secondary loop flattened and embossed integral with said seal core and terminating in a catch perpendicular to said primary loop, said sealing shank passing under said seal core and over said catch and having transverse cut nicks in the side toward said seal core and being adapted to be coiled toward said nicks about said seal core and caught over said catch, substantially as hereinbefore specified.

WINFRED MUDGE BROOKS.

Witnesses:
 ROSSLYN JAMOUNEAN,
 MORRIS MICHELSON.